M. G. HUBBARD.
Harvester.

No. 16,840.  Patented March 17, 1857.

Inventor:
M. G. Hubbard

UNITED STATES PATENT OFFICE.

M. G. HUBBARD, OF PENN YAN, NEW YORK.

IMPROVEMENT IN HARVESTERS.

Specification forming part of Letters Patent No. 16,840, dated March 17, 1857.

*To all whom it may concern:*

Be it known that I, M. G. HUBBARD, of Penn Yan, in the county of Yates and State of New York, have invented certain new and useful Improvements in Connecting Seats with Harvesters; and I do hereby declare the following to be a full, clear, and exact description thereof, reference being had to the accompanying drawings, which shows the seat in its different positions upon the compound mower and reaper.

My improvement herein set forth is peculiarly adapted to the compound mower and reaper, but may be used in any harvester where a shifting seat is desirable.

Figure 1:
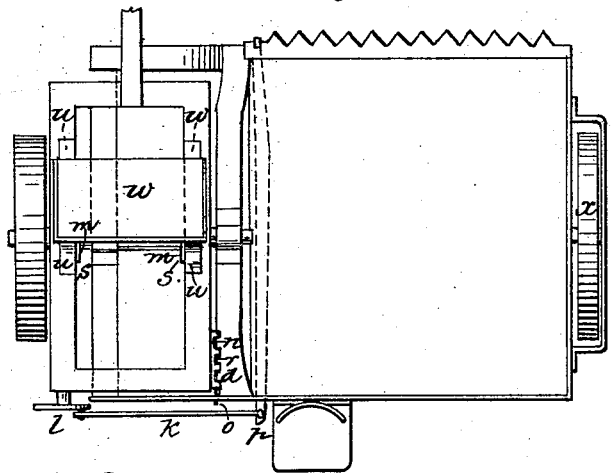
Figure 2:
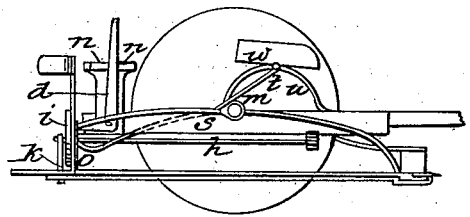
Figure 1:
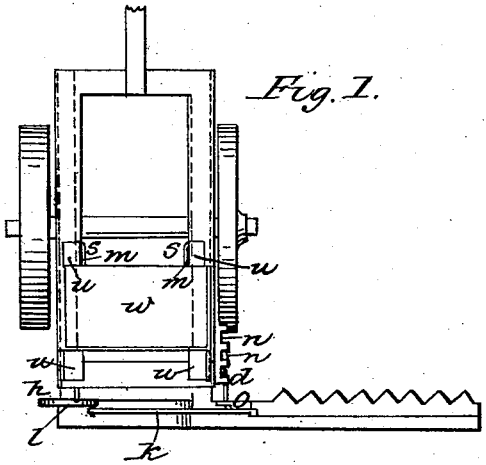

In the drawings, Figure 1 represents the plan of a reaper with the seat in its forward position. Fig. 2 is a side elevation of the frame, the platform in section.

$i$ is the crank-wheel that drives the cutters. $k$ is the connecting-rod.

$r$ is the vibrating lever that moves the cutters. $d$ is the lever for raising and lowering the platform.

$n\ n$ are notches in a standard affixed to the frame to hold lever $d$ in position.

$o$ is the connection between lever $d$ and the platform.

$x$ is the wheel that supports the outer end of the platform.

$s$ is the pivoting-point of the rods $m$, that attach the seat to the frame.

$t$ is the connecting-joint of rods $m$ with the seat.

$w$ is the seat.

Figure 3:
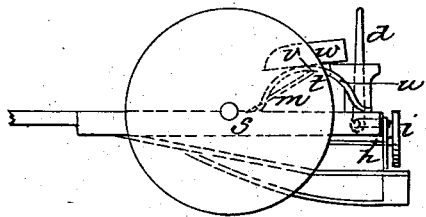

$u$ are the legs that sustain the seat at the proper elevation. The seat is of ordinary and convenient form, as seen at $w$. It has four legs, $u$, permanently affixed to it and simply resting upon the frame without being affixed to it. On each side there is a straight or other convenient-formed rod, $m$, pivoted at $s$ to the frame at one end and to the center or other convenient point on the seat underneath. This attachment holds the seat securely in its place and allows it to be at any moment thrown forward of the axle, as seen in Figs. 1 and 2, or back, as in Figs. 3 and 4, the range of motion depending upon the length of the rods $m$. Seats thus constructed and attached are easily and conveniently shifted, and when brought down upon the frame are permanently fixed in position, and are as secure to ride on as if bolted down by the legs to the frame.

I am aware that shifting seats have before been used in harvesters, and I do not claim making a seat therefor to shift independent of the device by which it is effected; but,

Having thus fully described my improvement, what I claim therein, and for which I desire to secure Letters Patent, is—

A shifting seat, when constructed, arranged, and combined with a harvester substantially in the manner and for the purposes set forth.

M. G. HUBBARD.

Witnesses:
ALB. H. HOUR,
JOHN WITSON.